United States Patent
Prow et al.

(10) Patent No.: US 6,601,801 B1
(45) Date of Patent: Aug. 5, 2003

(54) GAPPED TRAILING-EDGE CONTROL SURFACE FOR AN AIRFOIL

(75) Inventors: Clayton A. Prow, Everett, WA (US); Seiya Sakurai, Seattle, WA (US); Stephen L. Wells, Bothell, WA (US)

(73) Assignee: The Boeing Company, Seattle, WA (US)

( * ) Notice: Subject to any disclaimer, the term of this patent is extended or adjusted under 35 U.S.C. 154(b) by 0 days.

(21) Appl. No.: 10/131,109

(22) Filed: Apr. 24, 2002

(51) Int. Cl.[7] .................................................. B64C 9/16
(52) U.S. Cl. ....................................... 244/216; 244/217
(58) Field of Search ............................... 244/217, 211, 244/212, 213, 215, 216

(56) References Cited

U.S. PATENT DOCUMENTS

| | | | |
|---|---|---|---|
| 2,261,363 A | * | 11/1941 | Griswold |
| 2,276,522 A | * | 3/1942 | Staufer |
| 2,920,844 A | * | 1/1960 | Marshall et al. |
| 4,015,787 A | * | 4/1977 | Maieli et al. |
| 4,120,470 A | * | 10/1978 | Whitener |
| 4,131,252 A | | 12/1978 | Dean et al. |
| 4,395,008 A | | 7/1983 | Sharrock et al. |
| 4,444,368 A | | 4/1984 | Andrews |
| 4,471,927 A | | 9/1984 | Rudolph et al. |
| 4,962,902 A | | 10/1990 | Fortes |
| 4,995,575 A | | 2/1991 | Stephenson |
| 5,566,910 A | * | 10/1996 | Diekmann et al. |

FOREIGN PATENT DOCUMENTS

| | | | | |
|---|---|---|---|---|
| DE | 1943680 | * | 6/1982 | ................. 244/215 |
| FR | 846337 | * | 6/1939 | ................. 244/215 |

* cited by examiner

*Primary Examiner*—Tien Dinh
(74) *Attorney, Agent, or Firm*—Alston & Bird LLP

(57) ABSTRACT

An airfoil assembly, such as a wing or horizontal stabilizer, has a gapped trailing-edge control surface and a door connected to the control surface by a linkage such that deflection of the control surface in one direction causes the door to pivot, thus opening an air flow slot for air to flow through. The air flow slot begins to open immediately with deflection of the control surface from its nominal position, thus establishing a desirable level of air flow to suppress separation on the control surface. The linkage connecting the control surface to the door is free of rolling or sliding elements, consisting exclusively of members pivotally connected to one another.

25 Claims, 4 Drawing Sheets

GAPPED TRAILING-EDGE CONTROL SURFACE FOR AN AIRFOIL

FIELD OF THE INVENTION

The present invention relates to airfoil assemblies such as wings or stabilizers having movable control surfaces such as ailerons, flaps, elevators, and the like. The invention relates more particularly to such a control surface that is designed to create an air flow slot between the control surface and the fixed airfoil to which it is attached when the control surface is deflected away from a nominal position, so that air can flow through the air flow slot and thereby reduce the tendency for air to separate when flowing over the deflected control surface.

BACKGROUND OF THE INVENTION

An aircraft wing requires two primary aerodynamic characteristics to perform well on takeoff. First, the wing must have sufficient lift at a given angle of attack, and second, the wing must have a high lift-to-drag ratio during the climb segment of the takeoff maneuver. These two characteristics can often be in opposition.

To obtain sufficient lift at a given angle of attack, it is often necessary to employ a trailing-edge flap on a wing. A flap is an airfoil-shaped member pivotally attached to the trailing edge of the wing and extending along at least part of the wing's span. Deflecting the flap downward effectively increases the camber or curvature of the wing, which increases the lift of the wing at a given angle of attack. Flaps typically are limited in span because of the requirement for other devices such as ailerons on the outboard portions of the wings. Conventional ailerons are similar in structure to flaps, but their primary purpose is to provide directional and attitude control to the aircraft rather than to augment the lift of the wings.

While lowering the flaps substantially increases the wing lift, it also results in increased drag. The aerodynamic drag of the wing comes from several sources, but one important source called "induced" drag has its genesis in non-uniform distribution of the aerodynamic lift along the span of the wing. It is not possible to have uniform lift along the span of the wing, because the lift must fall to zero at the tip of the wing. Accordingly, induced drag is an inevitable component of the overall wing drag. It is known, however, that induced drag can be minimized or reduced by designing the wing to have a spanwise lift distribution that is as close as possible to a theoretical optimum lift distribution having a generally elliptic shape. When flaps are deflected, the lift is increased over the part of the span having the flaps, while the outboard portions of the wings not having the flaps do not have augmented lift. The lift distribution therefore is driven away from the optimum elliptic shape, resulting in increased induced drag.

To counteract this effect, deflected ailerons have been used to add lift to the outboard portions of the wings during takeoff in an attempt to drive the lift distribution closer to the theoretical optimum. Traditional ailerons of the sealed, simple-hinged type can undergo only moderate deflections before they begin to separate, and therefore can add only a small amount of outboard lift before flow separation begins. Further deflection of the ailerons beyond this point may actually add more drag as a result of flow separation than is saved by reducing the induced drag, such that the overall drag may rise.

It is known that the angle to which an aileron can be deflected without separating can be substantially increased by providing an air flow slot between the fixed wing and the aileron such that air can flow through the slot. This type of aileron is sometimes referred to as a "gapped" aileron. When a gapped aileron is deflected trailing-edge down, air flows from the lower surface of the wing through the air flow slot to the upper surface of the wing and over the upper surface of the aileron, which tends to prevent flow separation on the aileron.

Flow through the air flow slot is not desirable in cruise flight conditions because it can impair the aerodynamic efficiency of the wing. Accordingly, movable trailing-edge control surfaces have been developed that have an air flow slot when the control surface is deflected but wherein the air flow slot is closed when the control surface is in an undeflected or nominal position such as during cruise flight. To this end, a door along one surface of the wing is pivotable from a nominal position closing the air flow slot when the surface is undeflected, to a position opening the air flow slot when the control surface is deflected toward the surface of the wing having the door.

Prior gapped trailing-edge control surface mechanisms of this type have tended to be quite complicated, employing a large number of moving parts, which leads to increased cost and complexity of assembly and maintenance. Some of these devices have employed cam tracks and cam followers such as rollers for mechanically linking the door to the control surface so that deflection of the control surface causes the door to open. Such cam track and roller arrangements are subject to wear and can bind as a result of slight misalignments that can occur in service. Some prior gapped trailing-edge control surfaces have had the pivot for the control surface located outside the aerodynamic contour of the wing, which causes increased aerodynamic drag during all phases of flight. Additionally, in some prior devices, the opening of the door in response to deflection of the control surface has not been sufficiently rapid, such that less than an optimal amount of air flow through the air flow slot has been achieved.

SUMMARY OF THE INVENTION

The present invention addresses the above needs and enables other advantages. In accordance with one aspect of the invention, an airfoil assembly, such as a wing or horizontal stabilizer, comprises a fixed airfoil and a movable control surface connected to the trailing edge of the fixed airfoil, the control surface being rotatable about a pivot relative to the fixed airfoil. The control surface is spaced rearwardly from the trailing edge of the fixed airfoil such that an air flow slot is defined between the fixed airfoil and the control surface. The airfoil assembly also includes a movable door connected to the fixed airfoil proximate a first aerodynamic surface thereof, the door having a forward edge and an aft edge that respectively form substantial seals with the airfoil and the control surface when the control surface is in a neutral position so as to close off the air flow slot. The assembly further includes a linkage connecting the door to the control surface. The linkage is structured and arranged such that when the control surface is pivoted in a first direction to move the trailing edge of the control surface generally toward the first aerodynamic surface, the door is caused to rotate about a pivot spaced from the aft and forward edges of the door in such a manner that openings for air flow through the air flow slot are created between the aft edge of the door and the control surface and between the forward edge of the door and the airfoil. The openings thus enable a desirable amount of air flow to suppress flow separation on the control surface.

Preferably, the pivot about which the control surface rotates is located inside the external aerodynamic contour of the fixed airfoil. Thus, there are no external pivots and associated fairings giving rise to added drag of the airfoil.

The airfoil in one embodiment includes a panel connected to the fixed airfoil on an opposite side thereof from the door. The panel closes the air flow slot when the control surface is in its neutral position and when the control surface is pivoted away from the neutral position in a second direction opposite from the first direction that causes the door to open, but allows the air flow slot to open when the control surface is deflected in the first direction. The panel allows the control surface to be deflected to larger angles in the second direction.

In accordance with another aspect of the invention, the linkage connecting the control surface to the door is free of rolling or sliding elements, consisting exclusively of members pivotally connected to one another. This arrangement has advantages in terms of ruggedness and reduced wear compared to prior gapped control surface mechanisms employing cam tracks and rollers.

More particularly, the linkage includes a door control arm arranged to rotate along with the control surface about the pivot thereof. The door control arm is connected to a crank to which the door is attached, and the crank is pivotal about a fixed pivot. The linkage further comprises a drive link connected between the door control arm and the crank, a bracket rigidly affixed to the door, and a stabilizing link. One end of the stabilizing link is connected to the bracket and the stabilizing link is rotatable about a fixed pivot longitudinally offset from the fixed pivot for the crank. The crank is rotatably connected to the bracket at a location longitudinally spaced from the one end of the stabilizing link. The fixed pivot for the stabilizing link is forward of the fixed pivot for the crank, and the one end of the stabilizing link is forward of the location at which the crank is connected to the bracket.

The control surface in one embodiment comprises an aileron for a wing, and has an advanced airfoil shape providing improved aerodynamic efficiency at low air speeds. The door controls the opening of the air flow slot at the lower surface of the wing, and the panel closes the air flow slot at the upper surface of the wing when the aileron is not deflected trailing-edge down. When the aileron is deflected trailing-edge down and air is flowing through the air flow slot onto the upper surface of the aileron, the air is accelerated to its maximum velocity where the maximum curvature exists on the aileron upper surface, which is located in the region of the air flow slot at the upper surface of the wing. It has been found that this allows the leading-edge pressure peak to be driven to a lower coefficient of pressure without the aileron separating, such that the aileron can be deflected to greater trailing-edge down angles before separation begins. The aileron therefore can be used to provide significant lift enhancement for the outboard portion of the wing.

The airfoil in accordance with the invention can be a main wing for an aircraft, or an auxiliary airfoil such as a horizontal stabilizer or the like. The control surface can be an aileron, a flap, an elevator, or the like.

BRIEF DESCRIPTION OF THE DRAWINGS

The above and other objects, features, and advantages of the invention will become more apparent from the following description of certain preferred embodiments thereof, when taken in conjunction with the accompanying drawings in which.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
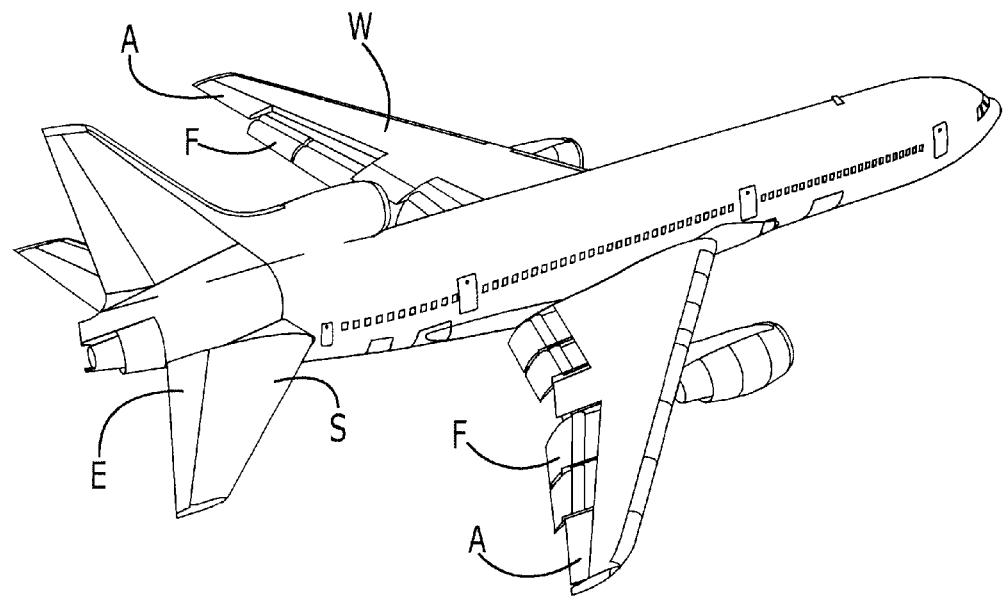
FIG. 1 is a perspective view of an aircraft whose wings have trailing-edge flaps and outboard ailerons.

The invention pertains to airfoils for aircraft such as the one shown in FIG. 1. An aircraft may include a number of surfaces referred to as airfoils herein, including a main wing W and a horizontal stabilizer S. The main wing W may include trailing edge control surfaces including flaps F and outboard ailerons A. The horizontal stabilizer S may include trailing edge control surfaces such as elevators E. Each of the control surfaces essentially comprises an airfoil-shaped structure that is pivotally attached to the associated fixed airfoil so that the control surface can be deflected in a trailing-edge down and/or trailing-edge up direction relative to a neutral position faired with the fixed airfoil. Flaps F generally are deflected only trailing-edge down, and are used during takeoff to increase the lift of the wing. Ailerons A and elevators E typically are deflected both trailing-edge up and trailing-edge down, and are used primarily to control the aircraft's roll and pitch attitude, respectively, although the ailerons can also be used to enhance lift during takeoff.

For purposes of illustrating the principles of the present invention, the invention is explained by reference to an embodiment comprising a wing having a gapped aileron. The invention, however, is applicable to any of the control surfaces mentioned above.

Figure 2:
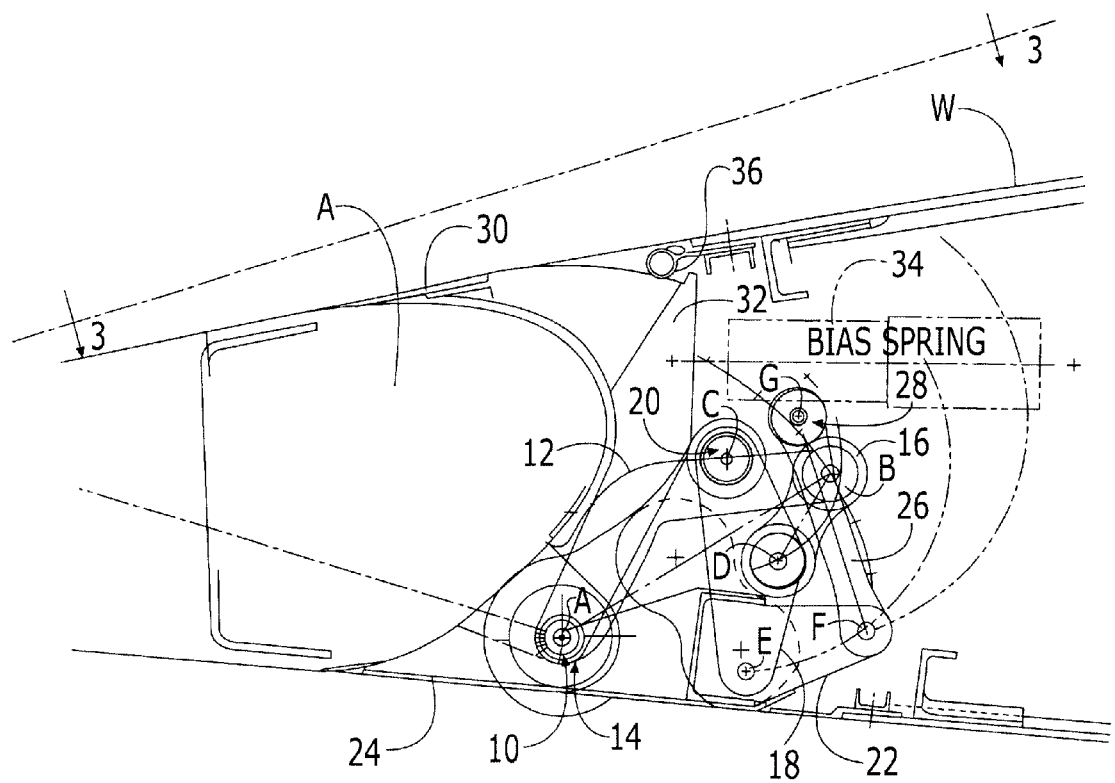
FIG. 2 is a sectioned side view of an outboard portion of one wing of the aircraft, showing an aileron and associated linkage connecting the aileron with a lower door, the aileron being depicted in its neutral position.

FIG. 2 shows a sectioned side view of a part of the outboard portion of a wing W having an aileron A pivotally connected thereto. Only the trailing-edge portion of the wing and the leading-edge portion of the aileron are shown, but it will be understood that the wing has a leading edge (not shown) located to the right in FIG. 2 and the aileron has a trailing edge (not shown) located to the left in the figure. In flight, air flows over the upper and lower aerodynamic surfaces of the wing in a right-to-left direction in FIG. 2.

Figure 3:
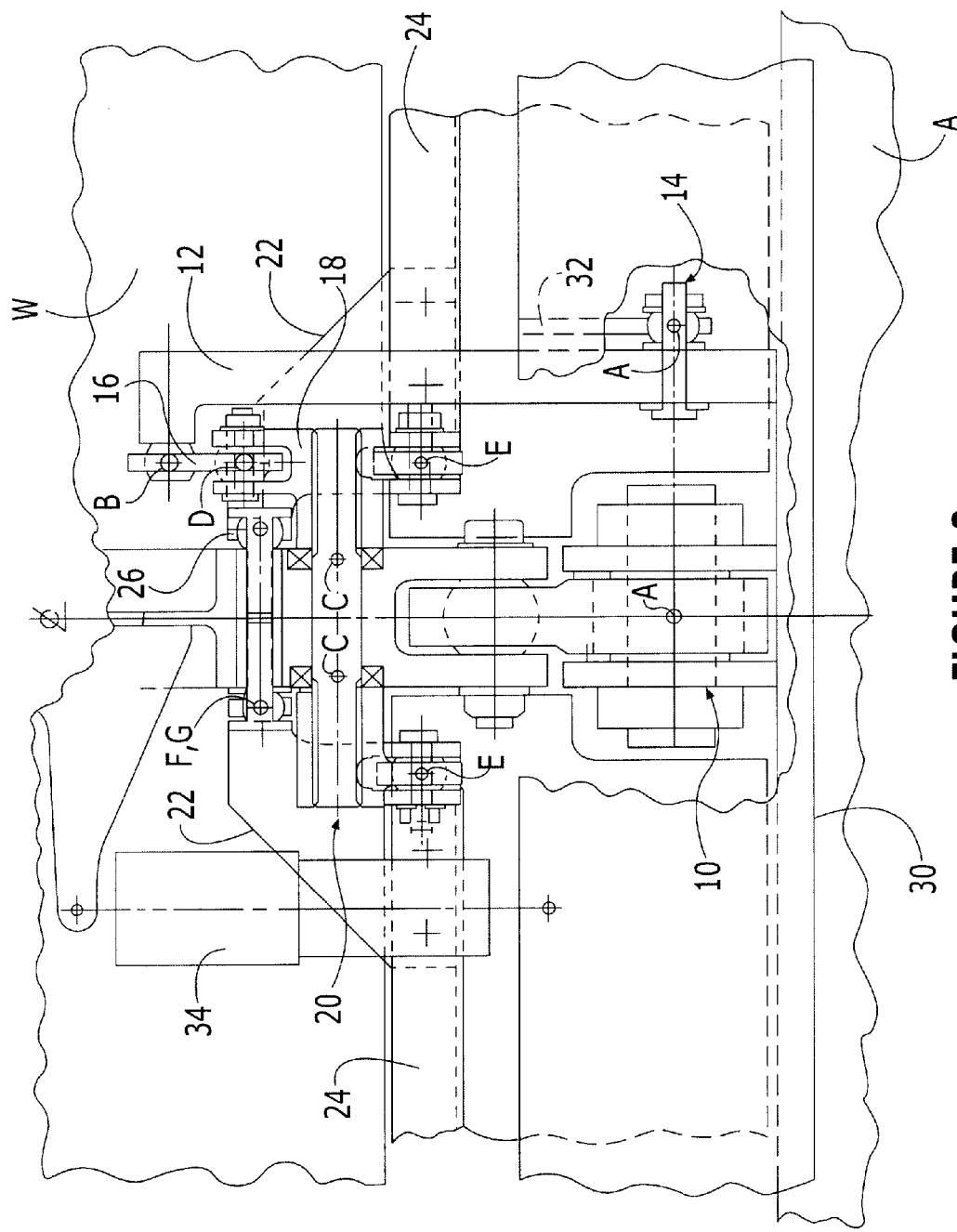
FIG. 3 is a top elevation of the outboard portion of the wing, partially broken away to show the linkage for the lower door.

FIG. 3 shows a top elevation of the trailing-edge portion of the wing and leading-edge portion of the aileron, partly broken away to show internal details of the aileron/door linkage. Air flow in FIG. 3 is from top to bottom.

The leading edge of the aileron A is not sealed with the wing W, such that an air flow slot is defined between the aileron and the wing. As further described below, a door 24 closes the air flow slot when the aileron is in a neutral, undeflected position as shown in FIG. 2. However, when the aileron is rotated trailing-edge down (counterclockwise in FIG. 2) from its neutral position, the door is moved by a linkage so as to open the air flow slot.

The aileron A is rotatable about a fixed pivot 10 located inside the external aerodynamic contour of the wing. The pivot 10 is positioned adjacent the lower aerodynamic surface of the wing beneath the leading edge of the aileron. A door control arm 12 is rigidly attached to the aileron. The control arm 12 is a generally dog-leg shaped lever (as viewed in side elevation) having its lower end attached to a fixed pivot 14 whose pivot axis is co-linear with that of the aileron's pivot 10. The control arm 12 extends upward and forward (i.e., toward the leading edge of the wing W, to the right in FIG. 2) from the pivot 14 and terminates at an upper end. The upper end of the control arm 12 is pivotally connected to one end of a drive link 16. The other end of the drive link 16 is pivotally connected to a middle vertex of a driven crank 18 of generally elongated triangular shape in side elevation.

The driven crank 18 has an upper vertex that is pivotally mounted in a fixed pivot 20 located just forward of the leading edge of the aileron A and about midway between the upper and lower aerodynamic surfaces of the wing. The fixed pivot 20 for the crank 18 thus is spaced vertically above and longitudinally forward of the pivot 14 for the control arm 12. The driven crank 18 has a lower vertex that is pivotally connected to a bracket 22. The bracket 22 is rigidly attached to the door 24. The door extends in a spanwise direction the length of the aileron A. The door extends longitudinally (i.e., forward to aft in the air flow direction) from a forward edge of the door located generally beneath the fixed pivot 20 for the driven crank 18 to an aft edge of the door located adjacent the lower aerodynamic surface of the aileron leading edge.

Figure 4A:
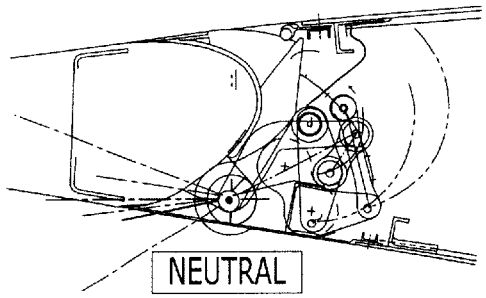
FIGS. 4A through 4J are a series of views similar to FIG. 2, showing the aileron in various trailing-edge down and trailing-edge up positions.
Figure 4B:
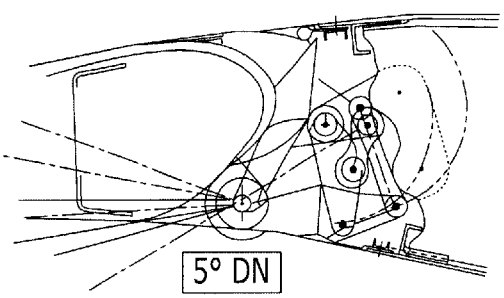

When the aileron is undeflected from its neutral position, the forward and aft edges of the door 24 form substantial seals with the wing structure and aileron, respectively, so that air flow through the air flow slot is prevented. This condition is depicted in FIGS. 2 and 4A.

The linkage between the aileron A and the door 24 further includes a stabilizing link 26. A lower end of the stabilizing link 26 is pivotally attached to a forward end of the bracket 22. An upper end of the stabilizing link 26 is connected to a fixed pivot 28 located just forward of and just above the fixed pivot 20 for the crank 18.

The linkage operates as follows during trailing-edge down deflections of the aileron A. With the aileron in its neutral, undeflected position as shown in FIG. 4A, the door 24 is closed such that the aft end of the door is closely adjacent to or contacts the lower surface of the aileron and the forward end of the door is closely adjacent to or contacts the fixed wing structure, thus closing the air flow slot between the aileron and wing. As the aileron is deflected trailing-edge down as shown in FIGS. 4B through 4F, the control arm 12 is rotated about its fixed pivot 14 (counterclockwise in the figures). The upper end of the control arm 12 thus lifts the drive link 16 upward, which in turn lifts the middle vertex of the driven crank 18 upward, causing the crank 18 to rotate about its fixed pivot 20 in the same direction that the control arm 12 rotates. This causes the crank 18 to rotate the door 24 about the fixed pivot 20, thereby opening the air flow slot. The amount the air flow slot is opened is proportional to the deflection of the aileron, as can be seen by comparing FIGS. 4B–F with one another.

The door's movement is also constrained by the stabilizing link 26, because the forward end of the bracket 22 is constrained to move in a circular path about the fixed pivot 28 for the stabilizing link. As a result of the relative locations of the fixed pivots 20 and 28 and the relative lengths of the crank 18 and stabilizing link 26, the rotation of the door about the fixed pivot 20 causes the door to also undergo an opposite rotation about the door's attachment to the crank 18. Accordingly, the movement of the door 24 is a compound rotation about two spaced axes. The primary rotation component is the rotation about the pivot 20 in the same direction as the aileron's rotation; the secondary rotation component is the rotation of the door relative to the crank 18 in the opposite direction from the aileron's rotation.

Figure 4C:
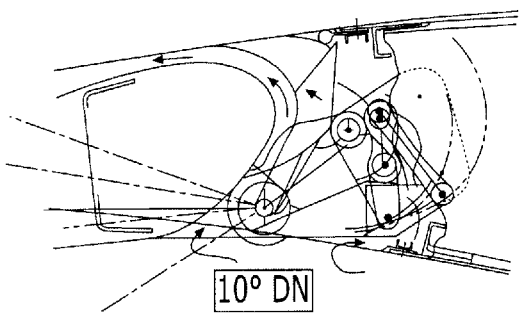
Figure 4D:
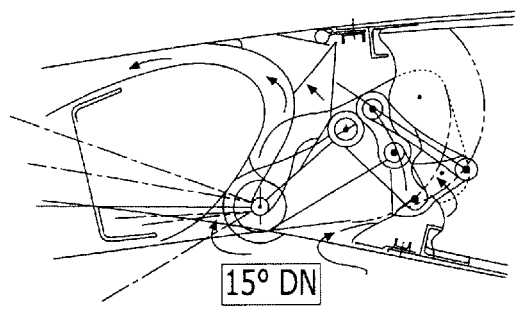
Figure 4E:
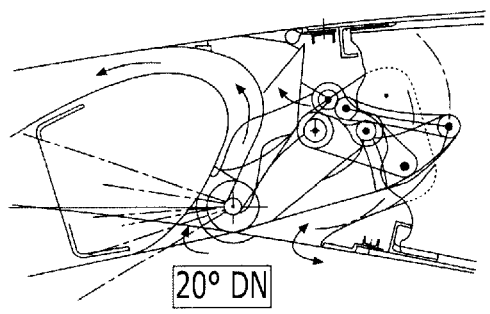
Figure 4F:
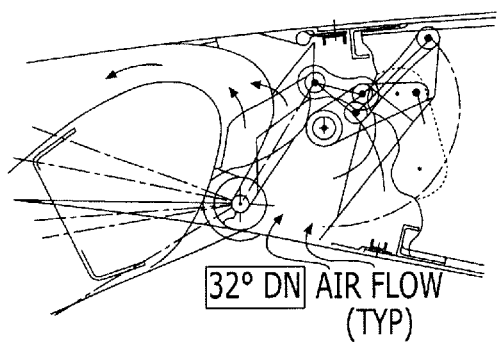
Figure 4G:
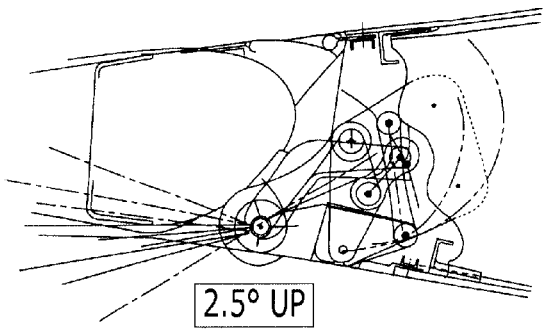
Figure 4H:
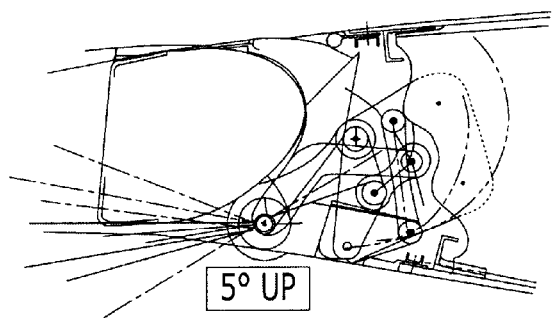
Figure 4I:
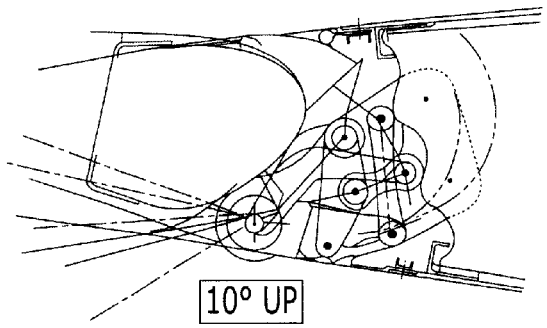
Figure 4J:
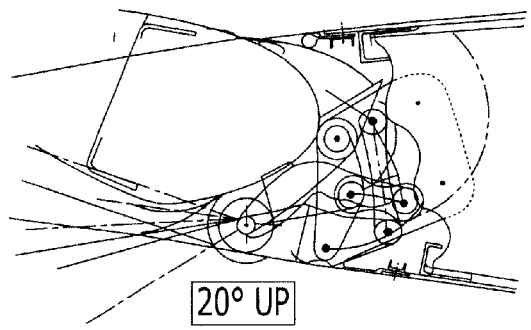

This arrangement of the door and associated linkage has several advantages. When the aileron is deflected trailing edge down by low or moderate amounts (e.g., 10 to 15 degrees as shown in FIGS. 4C and 4D), the movement of the door 24 creates openings for airflow not only between the aft edge of the door and the aileron, but also between the forward edge of the door and the fixed wing structure. Accordingly, even at small angles of aileron deflection, a substantial area for airflow opens up. At maximum deflection of the aileron, such as 32 degrees down as shown in FIG. 4F, the door is positioned so as to pose substantially no restriction or impediment to the air flow through the air flow slot. Another significant advantage of the linkage is that the use of cam tracks and rollers is avoided altogether; all of the elements of the linkage are connected together by simple hinge joints.

The aileron A is also rotatable to trailing-edge up angles as shown in FIGS. 4G through 4J. The linkage for the door 24 is arranged such that the door 24 remains substantially in one position during trailing-edge up deflections of the aileron, and thus an opening is created between the aft edge of the door and the aileron. However, it is not desired for air to flow through the air flow slot during trailing-edge up aileron deflections. Accordingly, the wing assembly includes an upper panel 30 that closes the air flow slot during trailing-edge up deflections of the aileron. The upper panel 30 is rigidly affixed to support arms 32 (only one shown) that are pivotable about a pivot axis coinciding with that of the pivot 14 for the control arm 12. An aft edge of the upper panel 30 engages the upper aerodynamic surface of the aileron when the aileron is in the neutral position (FIGS. 2, 4A). When the aileron is deflected trailing-edge up as in FIGS. 4G–J, the aileron pushes on the panel 30 and causes the panel 30 and support arms 32 to pivot forward so that the panel remains engaged with the aileron, thus keeping the air flow slot closed. When the aileron is deflected back to its neutral position, the panel 30 is maintained in engagement with the aileron by a bias spring 34 that pushes the panel rearwardly; a stop 36 arrests the rearward movement of the panel 30 when the aileron is deflected trailing-edge down, so that the air flow slot is opened between the panel 30 and the aileron.

The aileron A preferably has an advanced airfoil shape for improved low-speed efficiency. More particularly, the leading edge of the aileron is designed so that for moderate to large trailing-edge down deflections of the aileron as shown in FIGS. 4E and 4F, the maximum curvature of the upper aerodynamic surface occurs near the exit of the air flow slot at the upper surface of the wing, so that a pressure peak (i.e., minimum pressure) occurs at this location. This allows for low curvature of the upper surface aft of the maximum curvature point, which prevents a second pressure peak aft of the first peak. In this manner, the leading edge pressure peak can be driven to a lower pressure without flow separation. In other words, the aileron can be deflected to larger trailing-edge down angles before separation begins, which enables greater lift enhancement to be achieved.

Many modifications and other embodiments of the invention will come to mind to one skilled in the art to which this invention pertains having the benefit of the teachings presented in the foregoing descriptions and the associated drawings. For instance, while a wing and aileron are described, the invention can be applied to other airfoils and control surfaces, such as a horizontal stabilizer and elevator, a wing and flap, etc. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. An airfoil assembly comprising:
    a fixed airfoil having a leading edge and a trailing edge and having opposite first and second aerodynamic surfaces;
    a movable control surface connected to the trailing edge of the fixed airfoil, the control surface being rotatable about a pivot relative to the fixed airfoil, the control surface being spaced rearwardly from the trailing edge of the fixed airfoil such that an air flow slot is defined between the fixed airfoil and the control surface for air flow from the first aerodynamic surface to the second aerodynamic surface;
    a movable door connected to the fixed airfoil proximate the first aerodynamic surface thereof, the door having a forward edge and an aft edge that respectively form substantial seals with the airfoil and the control surface when the control surface is in a neutral position so as to close off the air flow slot; and
    a linkage connecting the door to the control surface, the linkage being structured and arranged such that when the control surface is pivoted in a first direction to move the trailing edge of the control surface generally toward the first aerodynamic surface, the door is caused to rotate about a pivot spaced from the aft and forward edges of the door in such a manner that openings for air flow through the air flow slot are created between the aft edge of the door and the control surface and between the forward edge of the door and the airfoil.

2. The airfoil assembly of claim 1, further comprising a panel connected to the fixed airfoil proximate the second aerodynamic surface thereof, the panel closing the air flow slot when the control surface is in the neutral position or is pivoted away from the neutral position in a second direction opposite to the first direction, and allowing the air flow slot to open when the control surface is pivoted away from the neutral position in the first direction.

3. The airfoil assembly of claim 2, wherein the panel is pivotally connected to the fixed airfoil and is biased to seal against the control surface when the control surface is in the neutral position thereof and when the control surface is pivoted in the second direction away from the neutral position.

4. The airfoil assembly of claim 1, wherein the pivot for the control surface is located inside an external aerodynamic contour of the fixed airfoil.

5. The airfoil assembly of claim 1, wherein the linkage includes a door control arm arranged to rotate along with the control surface about the pivot thereof, the door control arm being connected to a crank to which the door is attached, the crank being pivotal about a fixed pivot.

6. The airfoil assembly of claim 5, wherein the linkage further comprises a drive link connected between the door control arm and the crank.

7. The airfoil assembly of claim 5, wherein the linkage further comprises a bracket rigidly affixed to the door, and a stabilizing link, one end of the stabilizing link being connected to the bracket and the stabilizing link being rotatable about a fixed pivot longitudinally offset from the fixed pivot for the crank.

8. The airfoil assembly of claim 7, wherein the crank is rotatably connected to the bracket at a location longitudinally spaced from the one end of the stabilizing link.

9. The airfoil assembly of claim 8, wherein the fixed pivot for the stabilizing link is forward of the fixed pivot for the crank, and the one end of the stabilizing link is forward of the location at which the crank is connected to the bracket.

10. The airfoil assembly of claim 1, wherein the linkage for moving the door comprises exclusively link members that are pivotally connected to one another, the linkage thus being free of rolling and sliding connections.

11. The airfoil assembly of claim 1, wherein the fixed airfoil has an upper aerodynamic surface proximate the panel and a lower aerodynamic surface proximate the door, and the control surface has a leading edge defined by an upper aerodynamic surface and a lower aerodynamic surface that meet at a leading-edge stagnation point in the neutral position of the control surface, and wherein the upper aerodynamic surface of the control surface leading edge has a maximum curvature at a location closer to the upper aerodynamic surface of the fixed airfoil than to the lower aerodynamic surface of the fixed airfoil when the control surface is in the neutral position.

12. The airfoil assembly of claim 1, wherein the pivot for the door is fixed, and wherein the door is further pivoted about another pivot that moves with the door when the door is pivoted about the fixed pivot.

13. An airfoil assembly comprising:
    a fixed airfoil having a leading edge and a trailing edge and having opposite first and second aerodynamic surfaces;
    a movable control surface connected to the trailing edge of the fixed airfoil, the control surface being rotatable about a fixed pivot located within an external aerodynamic contour of the airfoil assembly, the control surface being spaced rearwardly from the trailing edge of the fixed airfoil such that an airflow slot is defined between the fixed airfoil and the control surface for airflow from the first aerodynamic surface to the second aerodynamic surface;
    a movable door connected to the fixed airfoil proximate the first aerodynamic surface thereof, the door having a forward edge and an aft edge that respectively form substantial seals with the airfoil and the control surface when the control surface is in a neutral position so as to close off the airflow slot; and
    a linkage connecting the door to the control surface, the linkage being structured and arranged such that when the control surface is pivoted in a first direction to move the trailing edge of the control surface generally toward the first aerodynamic surface, the door is moved such that the forward edge of the door is moved generally toward the second aerodynamic surface within the external aerodynamic contour of the airfoil assembly so as to open the airflow slot, wherein the linkage is free of rolling and sliding joints, comprising members connected together by pivot joints.

14. The airfoil assembly of claim 13, further comprising a panel connected to the fixed airfoil proximate the second aerodynamic surface thereof, the panel closing the air flow slot when the control surface is in the neutral position or is pivoted away from the neutral position in a second direction opposite to the first direction, and allowing the air flow slot to open when the control surface is pivoted away from the neutral position in the first direction.

15. The airfoil assembly of claim 14, wherein the panel is pivotally connected to the fixed airfoil and is biased to seal against the control surface when the control surface is in the neutral position thereof and when the control surface is pivoted in the second direction away from the neutral position.

16. The airfoil assembly comprising:
a fixed airfoil having a leading edge and a trailing edge and having opposite first and second aerodynamic surfaces;
a movable control surface connected to the trailing edge of the fixed airfoil, the control surface being rotatable about a fixed pivot located within an external aerodynamic contour of the airfoil assembly, the control surface being spaced rearwardly from the trailing edge of the fixed airfoil such that an airflow slot is defined between the fixed airfoil and the control surface for airflow from the first aerodynamic surface to the second aerodynamic surface;
a movable door connected to the fixed airfoil proximate the first aerodynamic surface thereof, the door having a forward edge and an aft edge that respectively form substantial seals with the airfoil and the control surface when the control surface is in a neutral position so as to close off the airflow slot; and
a linkage connecting the door to the control surface, the linkage being structured and arranged such that when the control surface is pivoted in a first direction to move the trailing edge of the control surface generally toward the first aerodynamic surface, the door is moved so as to open the airflow slot, wherein the linkage is free of rolling and sliding joints, comprising members connected together by pivot joints, and wherein the linkage includes a door control arm arranged to rotate along with the control surface about the pivot thereof, the door control arm being connected to a crank to which the door is attached, the crank being pivotal about a fixed pivot.

17. The airfoil assembly of claim 16, wherein the linkage further comprises a drive link connected between the door control arm and the crank.

18. The airfoil assembly of claim 16, wherein the linkage further comprises a bracket rigidly affixed to the door, and a stabilizing link, one end of the stabilizing link being connected to the bracket and the stabilizing link being rotatable about a fixed pivot longitudinally offset from the fixed pivot for the crank.

19. The airfoil assembly of claim 18, wherein the crank is rotatably connected to the bracket at a location longitudinally spaced from the one end of the stabilizing link.

20. The airfoil assembly of claim 19, wherein the fixed pivot for the stabilizing link is forward of the fixed pivot for the crank, and the one end of the stabilizing link is forward of the location at which the crank is connected to the bracket.

21. An airfoil assembly, comprising:
a fixed airfoil having a leading edge and a trailing edge and having opposite first and second aerodynamic surfaces;
a movable control surface connected to the trailing edge of the fixed airfoil, the control surface being rotatable about a fixed pivot axis located within an external aerodynamic contour of the airfoil assembly, a leading edge of the control surface being spaced rearwardly from the trailing edge of the fixed airfoil such that an air flow slot is defined between the fixed airfoil and the control surface for air flow from the first aerodynamic surface to the second aerodynamic surface;
a movable door connected to the fixed airfoil proximate the first aerodynamic surface thereof, the door having a forward edge and an aft edge that respectively form substantial seals with the airfoil and the control surface when the control surface is in a neutral position so as to close off the air flow slot; and
a linkage connecting the door to the control surface, the linkage comprising:
a crank arranged to pivot about a fixed pivot spaced forward of the leading edge of the control surface, an end of the crank being connected to the door such that rotation of the crank about the fixed pivot causes the door to rotate about the fixed pivot;
a drive link having first and second ends, the first end being pivotally connected to the crank; and
a door control arm rigidly attached to the control surface, the door control arm being held in a fixed pivot such that the door control arm pivots with the control surface about the fixed pivot axis, an end of the door control arm being spaced forward of the fixed pivot for the crank when the control surface is in the neutral position, and the end of the door control arm being pivotally connected to the second end of the drive link, whereby rotation of the control surface in a first direction causes the linkage to move the door to open the air flow slot.

22. The airfoil assembly of claim 21, wherein the fixed airfoil comprises a wing and the control surface comprises an aileron, the door being arranged at a lower side of the wing.

23. The airfoil assembly of claim 21, wherein the linkage further comprises a stabilizing link and a bracket, the bracket being rigidly attached to the door and the end of the crank being pivotally attached to the bracket, a first end of the stabilizing link being pivotally attached to the bracket at a location spaced forward of where the crank is attached to the bracket, a second end of the stabilizing link being held in a fixed pivot spaced forward of the fixed pivot for the crank.

24. The airfoil assembly of claim 21, further comprising a movable panel arranged proximate the second aerodynamic surface of the airfoil at the trailing edge thereof and sealing against the control surface to close the air flow slot when the control surface is in the neutral position, and a support member rigidly affixed to the panel and extending therefrom generally toward the first aerodynamic surface of the airfoil, the support member being held in a fixed pivot such that the panel is urged to rotate about said fixed pivot by rotation of the control surface away from the neutral position in a second direction opposite to said first direction.

25. The airfoil assembly of claim 24, further comprising a spring biasing the movable panel rearwardly toward the control surface, and a stop for limiting rearward movement of the panel.

* * * * *